(12) United States Patent
Gebhardt et al.

(10) Patent No.: US 6,874,529 B2
(45) Date of Patent: Apr. 5, 2005

(54) LEVEL LIMIT VALVE

(75) Inventors: Markus Gebhardt, Treuchtlingen (DE); Helmut Kalb, Roth (DE); Günter Strauss, Treuchtlingen (DE); Stefan Kirchdorfer, Treuchtlingen (DE); Thomas Theuer, Treuchtlingen (DE)

(73) Assignee: Alfmeier Prazision AG, Baugruppen und Systemlosungen, Treuchtlingen (DE)

( * ) Notice: Subject to any disclaimer, the term of this patent is extended or adjusted under 35 U.S.C. 154(b) by 169 days.

(21) Appl. No.: 09/925,294

(22) Filed: Aug. 9, 2001

(65) Prior Publication Data

US 2002/0069915 A1 Jun. 13, 2002

(30) Foreign Application Priority Data

Aug. 17, 2000 (DE) .......................... 100 40 310

(51) Int. Cl.[7] .................. F16K 31/22; F16K 31/24; F16K 33/00
(52) U.S. Cl. ................ 137/448; 137/429; 137/433; 137/434; 141/198
(58) Field of Search ................. 137/429, 430, 137/433, 434, 442, 443, 444, 446, 448, 527; 141/198

(56) References Cited

U.S. PATENT DOCUMENTS

| | | | | |
|---|---|---|---|---|
| 2,569,110 A | * | 9/1951 | McGillis et al. | ............. 137/448 |
| 3,078,867 A | * | 2/1963 | McGillis et al. | ............. 137/448 |
| 3,963,041 A | * | 6/1976 | McGillis | ............. 137/410 |
| 4,508,139 A | * | 4/1985 | Teumer | ............. 137/527 |
| 4,816,045 A | | 3/1989 | Szlaga et al. | |
| 4,860,790 A | * | 8/1989 | Scaramucci | ............. 137/527 |
| 5,263,511 A | | 11/1993 | Ohasi et al. | |
| 5,322,100 A | | 6/1994 | Buechler et al. | |
| 5,439,129 A | | 8/1995 | Buechler | |
| 5,462,100 A | | 10/1995 | Covert et al. | |
| 5,605,177 A | | 2/1997 | Ohashi et al. | |
| 5,660,206 A | | 8/1997 | Neal et al. | |
| 5,740,842 A | | 4/1998 | Maier et al. | |
| 5,937,922 A | | 8/1999 | Hör et al. | |
| 5,950,692 A | | 9/1999 | Georgs et al. | |
| 6,026,853 A | | 2/2000 | Osterbrink | |
| 6,026,855 A | | 2/2000 | Jackson et al. | |
| 6,029,719 A | | 2/2000 | Hor et al. | |
| 6,138,852 A | | 10/2000 | Miura et al. | |
| 6,155,316 A | | 12/2000 | Benjey | |
| 6,296,014 B1 | | 10/2001 | Miura et al. | |
| RE37,776 E | | 7/2002 | Foltz et al. | |
| 6,415,827 B1 | | 7/2002 | Harris et al. | |
| 6,446,826 B1 | | 9/2002 | Foltz et al. | |
| 6,546,972 B1 | | 4/2003 | Foltz | |
| 6,679,396 B1 | | 1/2004 | Foltz et al. | |
| 6,691,750 B1 | | 2/2004 | Foltz | |
| 2003/0015526 A1 | | 1/2003 | Nakaya et al. | |
| 2003/0024599 A1 | | 2/2003 | Hagano et al. | |

FOREIGN PATENT DOCUMENTS

FR 2355736 * 2/1978 .................. 137/448

* cited by examiner

*Primary Examiner*—John Rivell
(74) *Attorney, Agent, or Firm*—Dority & Manning P.A.

(57) ABSTRACT

The invention concerns a level limit valve for the fuel tank of a vehicle. Such valves serve the purpose, that upon the filling of the fuel tank, the filled quantity of the fuel is limited. The proposed level limit valve possesses a valve body 1 which can be positioned within the fuel tank at the end of a filling pipe. The valve body is equipped with an intake port 22 which is connectable with the said filling pipe and an outlet port 21 emptying into the interior of the fuel tank. Further, in the valve body 1 is found a flap 4, which is pivotally movable between a position tightly sealing the outlet port 21 and a position wherein this is opened. The float 3 is movably connected to said flap 4 by means of a lever rod 5. The lever rod 5 penetrates the outlet port 21 at least in the opened position of the flap 4 and is connected by means of linkage with that outer side 28 of the flap 4 which is proximal to the outlet port 21.

17 Claims, 4 Drawing Sheets

LEVEL LIMIT VALVE

FIELD OF INVENTION

The invention concerns a level limit valve for the fuel tank of a motor vehicle. Such a valve is placed within the tank at the end of the intake pipe, which serves for the filling of the tank. Upon the attainment of a specified level of fuel, the valve is designed to close the intake pipe. When the intake pipe is thus closed, the fuel rises therein and triggers the feed nozzle to shut off. The closure of the intake pipe is assured by means of a pivoted flap shut-off in the valve body. This pivoted flap is coupled with a movable float on the valve body. At a low level of fuel in the tank, the flap opens, so that the fuel, through valve intake and outlet ports, can again enter the tank. Toward the end of the filling process, the said float rises and moves the valve flap into its closed position, in which the flap seals the exit port.

BACKGROUND OF INVENTION

In the case of conventional valves, the flap is supported with a pivoting axle in the valve body, which extends outward, through provided openings in the valve body wall. The outward extending ends of the pivoting axles are respectively movably connected with the float by means of a lever arm.

A disadvantageous aspect in the case of the conventional level limit valves, is that the fuel, suddenly blocked in entry by the shutting flap, fills up the pipe in a very short time and spills out through the inlet fitting. This gives the person attending the gas pump the impression, that the tank is not yet completely full, and as a result, must still be provided with more fuel, or he makes an effort to continue feeding until the gas pump display shows a nice round number. In spite of the use of a level limiting tank valve, measures must be taken, so that in spite of repeated "topping-off efforts" no fuel can enter into an associated, activated carbon filter through the air vent lines. The active carbon loses its effectiveness by contact with liquid fuels.

With the protection of the activated carbon filter in mind, the purpose of the invention is to propose a level limit valve, which avoids this disadvantage.

SUMMARY OF THE INVENTION

This purpose is achieved by means of a level limit valve with the features of the the invention. In accord with these features, a movable coupling is provided between the flap and the float, in which, a lever rod reaches through the discharge port of the valve body, at least in the opened position of the flap. The said lever rod is moreover joined in a linked manner with the flap. The connection is made on the outer side of the flap, which is proximal to the discharge port of the valve. This embodiment makes possible, that the pivoting axle of the flap can be brought entirely within the valve body. Penetrative openings in the valve body, through which the pivoting axle is guided to the outside, are no longer necessary in the invented design. The liquid fuel, which, when the flap is closed, backs up in the filling pipe and shuts off the delivering nozzle, now has no more possibility of continuing to run into the tank. Thus, post-tanking as described, is thus prevented.

In an advantageous embodiment, in the valve body is to be found a boring uniting the valve interior chamber with the interior of the tank. This boring is so designed, that it permits only a very small back flow of any fuel which may be trapped in the filling pipe. This will be hardly perceptible to the service person at the pump. After the filling operation of the vehicle, then any fuel remaining in the filling pipe can run back into the tank.

In the case of an embodiment, which shows a particular advantage when viewed from a consideration of the technical aspects of manufacture, the valve body is essentially constructed as a cut-off section of tube, whereby on the end surface thereof, confronting the fuel flow, a transverse wall is placed around the outlet port. This transverse wall serves as a carrier of a sealing edge which circumferentially encompasses the outlet port in a ring shaped manner and functions together with the periphery of the flap. Further, this transverse wall serves as a carrier of a bearing seat, which in turn serves for the reception of the pivoting pins which are integral with the said flap. For the mounting of the flap in the valve body, the flap must be introduced therein and its pivoting pins inserted into the bearing seats. The bearing seats are easily made in the process of injection molding by means of valve body webs formed on the inner side of the transverse wall and are made from the circumferential wall of the of the valve body. The pivot pins are formed on the edge of the flap rim by short webs, whereby the body webs, in the assembly stage, extend themselves into the area between the pivot pins and the rim of the flap.

In the case of a further advantageous embodiment, on the end surface of the inlet port of the valve housing, a connection fitting is installed, especially with the aid of a snap-in connection. On the end thereof, extending with the flow, are integrally placed two detent projections which extend themselves in axial direction of the valve body. These extend themselves through the inlet port, into the valve chamber and affix the pivot pins in the bearing seats. This arrangement eases the assembly work. Because of the fact, that the connection fitting is not molded onto the valve body, in which it would be of one part with the said fitting, the invented valve body is more easily accessible for the installation of the flap. The affixing of the pivot pins in the bearing seats is carried out simultaneously with the affixing of the said connection fitting onto the valve body.

In a further advantageous embodiment of the invention, in the direction of the flow, a flow diverting means is installed. This prevents a direct impingement of the fuel flow against the flap when the latter is in its opened position. By this means, it is excluded, that the inflowing fuel closes the flap, before the specified level in the tank has been reached. The flow diverter narrows the inflowing fuel directly in front of the flap. This narrowing brings about the result, that an entry of the valve flap into the valve body is made more difficult during the assembly. On this account, provision has been made, that the flow diverter is placed in the intake fitting. The flap, in this case, can then, without hindrance, be installed in the valve body.

The float is movably set with bearings on a shaped float carrier at the end surface, in downstream of the valve body. The float is essentially installed to pivot in a vertical direction. A connection between the float and the flap is enabled by a through opening, located centrally in the upper side of the float carrier, which opening is penetrated by a lever arm. This connection is particularly sparing of space in a vertical direction and carried out with very few linkages.

BRIEF DESCRIPTION OF DRAWINGS

The invention will now be more closely described with the aid of the drawings of a presented embodiment example. There is shown in.

DETAILED DESCRIPTION

Figure 1:
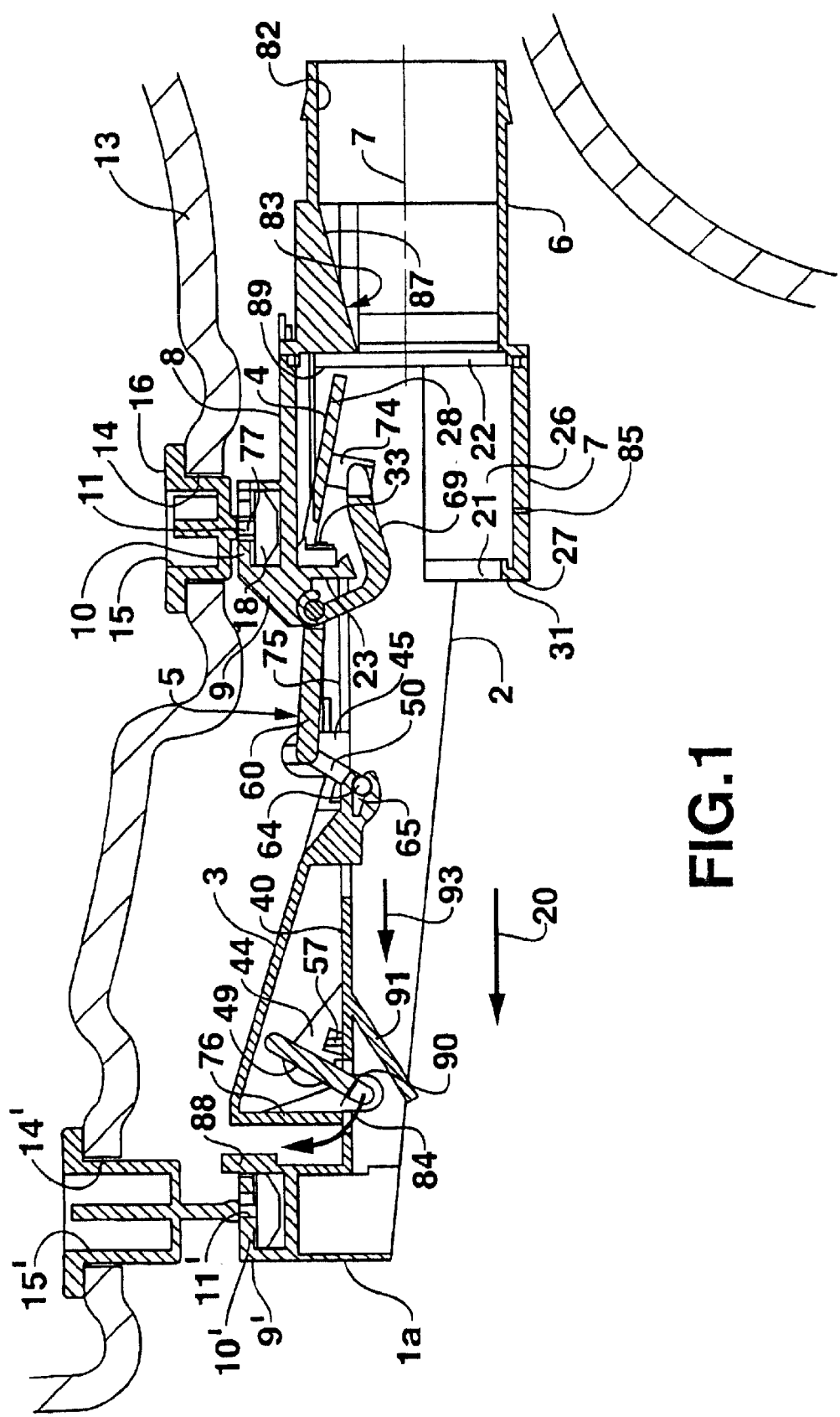
FIG. 1 a level limit valve in a longitudinal section.

The level limiting valve—hereinafter "valve"—presented in the above illustrations encompasses as its principal components:

- a tube section shaped valve body 1,
- a float carrier 2 connected with said valve body 1 on an end piece 31 in direction of the fuel flow,
- a float 3, movably set on said float carrier 2,
- a flap 4, inside the valve body, which is movably connected by means of a lever arm 5 to the float 3, and
- an intake fitting 6.

The valves are so arranged in the assembly operation, that the center axis 7 of the connection fitting 6, i.e. also that of the valve body 1, runs somewhat horizontally.

The valve body 1, on its top, is somewhat flattened, forming thereby a flat surface 8. In the case of the embodiment example in accord with FIG. 1, on this flat surface 8, an attachment element 9 is placed. The attachment element 9 possesses a top wall 10 which, when seen in the assembly operation, in a vertical direction from the said flat surface 8, is somewhat distanced therefrom. A through opening 11 has been made available in said top wall 10. For the fastening of the valve on the inside of an upper tank wall 13, this wall 13 exhibits an opening 14, in which a somewhat pot-shaped carrier 15 is inserted. The carrier 15 lies with a flange 16 on the outside of the tank wall 13, which flange 16 radially extends beyond the circumference of the carrier 15. Projecting from the bottom wall of the carrier 15, is found a pin 17, the free end of which forms a head shaped locking part 18. The shape of the through opening 11 in the carrier 15 and the shape of the locking part 18 are so chosen, that the locking part 18 can be inserted into the through opening and after turning, perhaps some 90°, it engages the wall 10 from behind. On the free end of the float carrier 2 a further affixing device 9' is installed, which likewise, works in conjunction with an installed carrier 15' in a tank wall opening 14'. In the embodiment example in accord with FIG. 2, which is presented without the float 3 or the lever rod 5, a fastening element 9" is integrally attached which is associated with a wall 10" which has a through opening 11". This works together with a carrier 15 (not shown) installed in the upper tank wall 13. In case of necessity, additional fastening elements can also be provided on the valve housing 1 or on the float carrier 2. The carriers 15, 15' are welded in place in the final stages of the assembly procedure.

Figure 2:
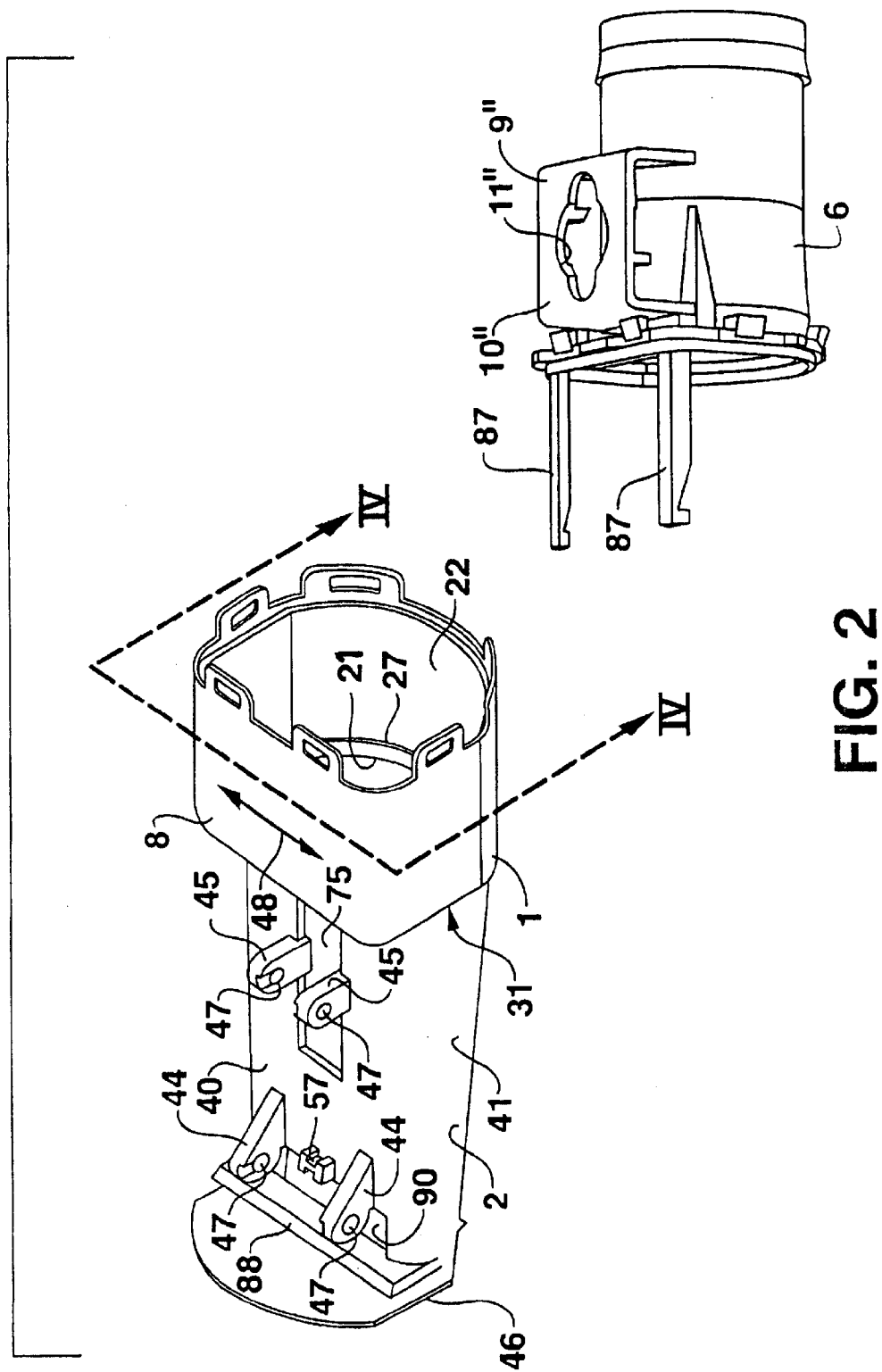
FIG. 2 a second level limit valve, slightly changed from FIG. 1, in a perspective view FIG. 3 In views A to E, perspective presentations of a float, a flap, and the level arm which binds these two together, and FIG. 4 a cross-sectional view along the line IV—IV in FIG. 2
Figure 4:
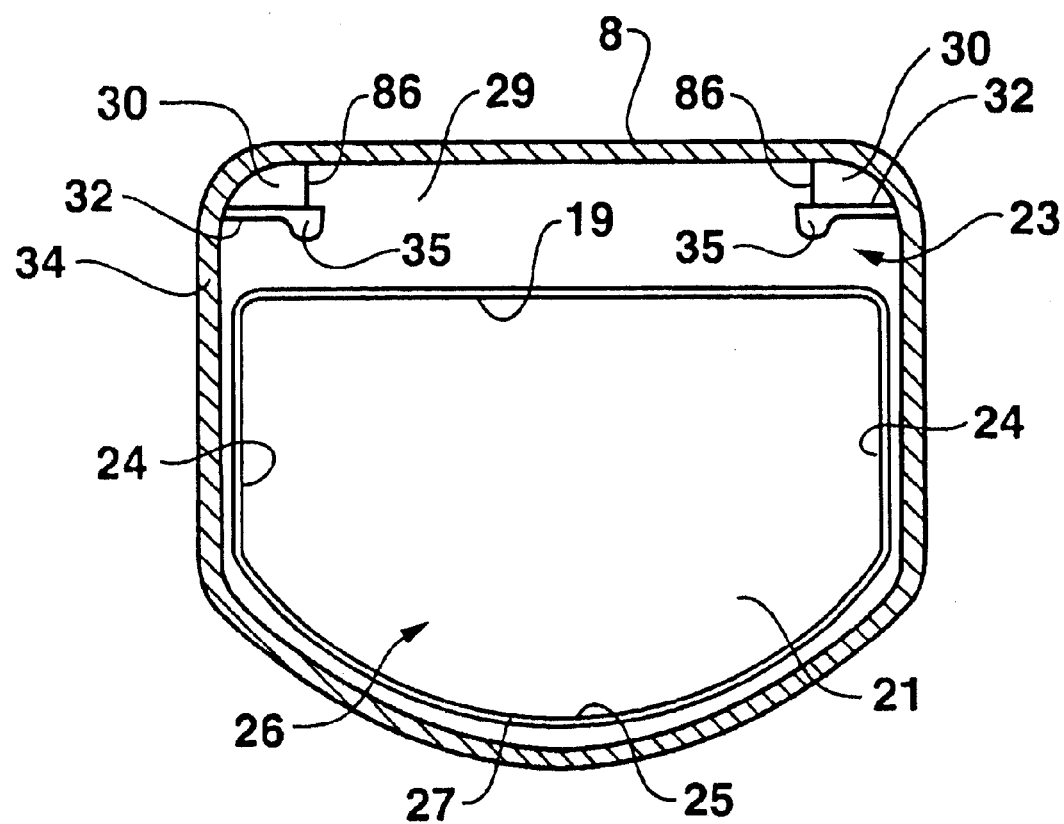

The valve body 1 possesses two ports. One, is outflow port 21, located downstream in flow direction 20 of the incoming fuel in the filling pipe (pipe not shown). The other is the intake port 22 located upstream therefrom. The outflow port 21 is placed in a transverse wall 23, and has a shape which, in cross-section, follows the outline shape of the valve housing. The upper side 19 of said port (see FIG. 4) runs parallel to the upper, flattened wall section of the valve body, i.e. parallel to the flat surface 8. Two straight and parallel sections join the said upper side 19, thus forming side sections 24. These side sections are bound together by a continuing, bowed bottom side section 25. The entire rim of the outlet port itself is shaped into a projecting sealing edge 27 which extends upstream into the interior chamber 26 of the valve (FIG. 1). The sealing edge 27 acts in conjunction with the outer side of the flap 4 in the sense of a closure of the valve interior chamber 26. On the wall area 29 of the transverse wall 23 immediately above the outlet port 21, are placed two bearing seats 30. These seats 30 are for the acceptance of the integral pivoting pins 33 of the flap 4. The bearing seats 30 are, respectively, formed from a body web 32 placed on the inside of the valve body wall 34 and the inside of the wall area 29. The body webs 32 run parallel to the flat surface 8 and possess on their free ends a thickening 35 which serves for increasing their mechanical stability.

Figure 3:
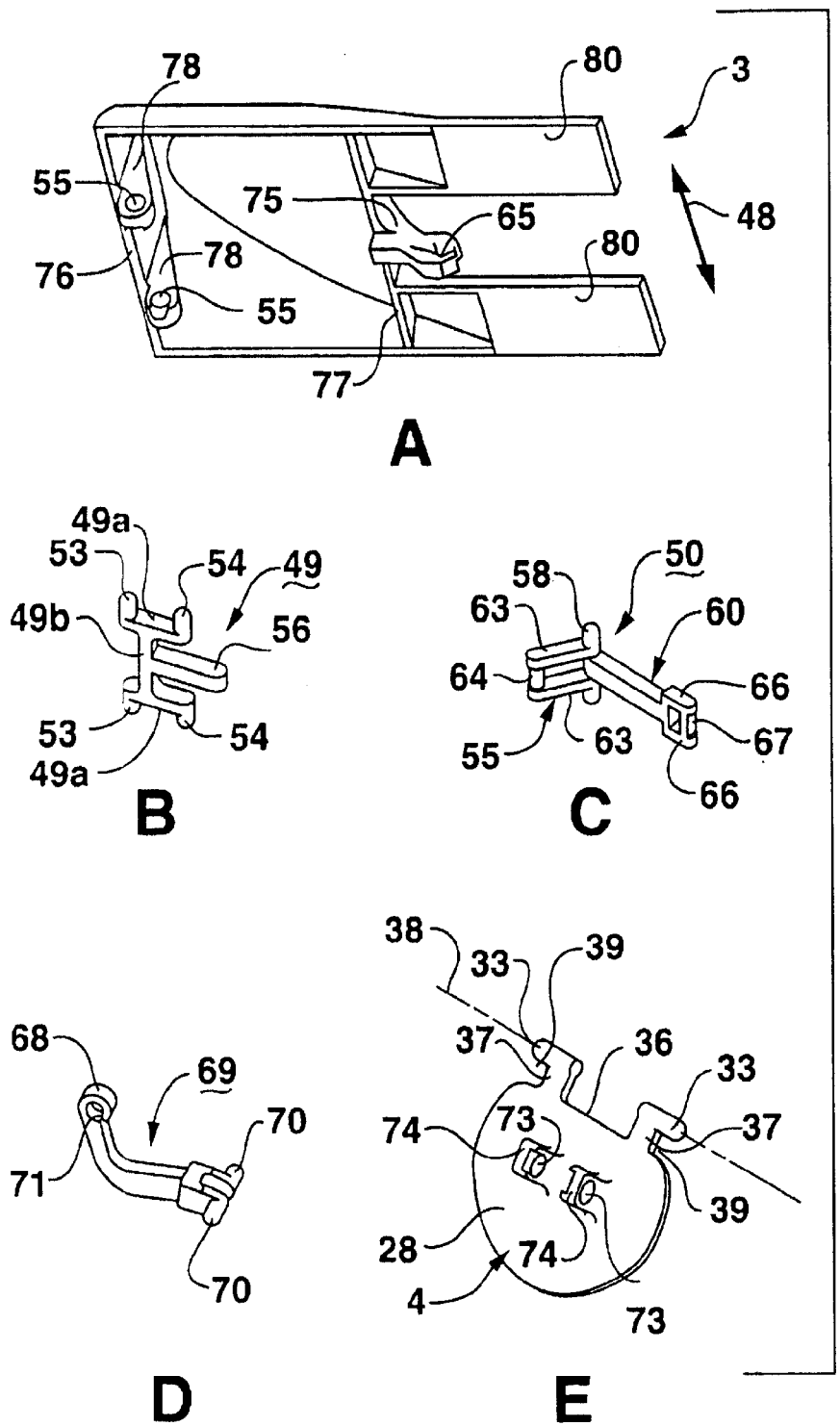

The flap 4 possesses a shape profile, which follows the cross-sectional shape of the corresponding outlet port 21 and also has in its upper rim, essentially, a straight line section 36 (see FIG. 3). On this said rim section 36, respectively on each side, is formed from an extending or cross piece 37, a pivot pin 33. The pivot pins 33 extend in the direction of an imaginary pivoting axis 38, which, during assembly, runs at right angles to the valve center axis 7 and parallel to the flat surface 8. Again in the assembly procedure, each pivot pin engages in a bearing seat 30, whereby, the body web 32 extends itself in each case into the intervening space 39 between the upper edge 36 of the flap 4 and the pivot pins 33 (FIG. 3E).

The float carrier 2, which retains the float 3, is essentially shaped as a trough. This carrier possesses an upper wall 40, upon which are formed lateral side walls 43, which, in assembly, extend vertically downward. On the outer surface of the wall 40, which is designed to be flat, are two pair of bearing projections 44, 45. The bearing projections 44 are located proximal to the free end 46 of the float carrier 2 and the bearing projections 45 are placed near to the valve housing 1. The bearing projections 44, 45 are spaced apart in the transverse direction 48 (see FIG. 2) and carry the bearing eyes 47 for the pivoting bearing of the float 3 and the lever rod 5.

The float 3 is bearing supported with a parallelogram-linkage arrangement on the float carrier 2. This arrangement is constructed with two linkages, 49 and 50. The link 49 is basically an H shaped injection molding part, having two parallel legs 49*a* and one cross piece 49*b* binding these together. From the ends of the said parallel legs 49*a*, more exactly, from their outer surface, extend pivot pins 53, 54. The pivot pins 54 are held by the bearing projections 44. The two other pivot pins 53 are inserted in the bearing eyes 55 on the underside of the float 3. On the cross piece 49*b* of the linkage piece 49, a centrally located detent pin 56 forms an integral projection. This detent pin 56 coacts with a counter abutment 57, which extends out of the upper wall 40 of the float carrier 2. This detent arrangement serves for the limiting of the upward movement of said float 3. The lever rod 5 extends itself between a linkage lever 50 and a linkage lever 69. The linkage lever 50 is formed from a pivot axle 58 and two lever arms 59, 60 integrally placed thereon. The lever 59 comprises two parallel running connectors 63, the free ends of which are bound together by a pivot pin 64. The pivot pin 64 lies in a bearing eye, described in more detail below, of the float 3, while the pivot axle 58, inserts itself at the free end in the bearing eyes 47 of the bearing projection 45. The lever arm 60, on its free end, widens itself into a forked form, whereby the free ends of the fork legs 66 are bound together by a pivot axle 67. On this pivot axle 67 is a further linkage lever 69, secured with bearing in eye 68. The bearing eye 68 possesses a slot 71, which enables a snap connection with the pivot axle 67. On its distal end from the bearing eye 68, the linkage lever 69 possesses two pivot pins 70, pointing away from one another. The pivot pins 70 in turn, lie in the bearing eyes 73, which are located in the clips 74, projecting from the outer side 28 of the flap 3.

In the wall 40 of the float carrier 2 is provided a centrally located opening 75, extending itself in the direction of the center axis 7 up to the valve housing 1. On the longitudinal edges of this opening the bearing projections 45 are formed, which carry the linkage lever 50. The movement path of the lever rod 5, during the movement of the flap 3, in its open/shut position, extends itself through this opening 75.

The float 3 is, essentially, a longitudinal section of a cylinder and is also open at the bottom. The float 3 possesses two transverse end walls, 76 and 77. The transverse wall 76 possesses two bearing projections 78, which are provided with the bearing eyes 55 to work together with the pivot pins 53. On the other transverse wall, in the middle is found a holding clip 79 in the free end of which, the bearing eye 65 is found, which receives the pivoting axle 64. On the outside of the transverse wall 77 are finally, still two, essentially plate shaped projections 80, the transverse direction 48 intervening distance of which is so dimensioned that the pair of bearing projections 45 finds space therebetween. On the upper side, the float 3 possesses a flattened section 94 stretching in an inclined manner from the transverse wall 76 to the projections 80. This section 94 limits the height of the float. The valve, on this account, can then be positioned relatively closer to the upper tank wall 13.

The described valve operates in accord with the following.

In the illustrated view of FIG. 1, the float 3 is not immersed in fuel. The float 3 lies with its transverse walls 76 and 77 and with the flat projections 80 on the upper wall 40 of the float carrier 2. The flap 4 is now in its open position. So that the inflowing fuel in flow direction 20, through the inlet fitting 6 and through the valve housing 1, cannot move the flap 4 into its closed position, a flow diverter 83 is placed ahead (as seen in flow direction) of said flap 4. This is formed from an inclined piece 81 which is inclined away from the inner wall of the inlet connection fitting 6. As the end of the tanking process approaches, the fuel level reaches the float 3, so that this begins to float.

The floating movement is carried out in the direction of the arrow 84, regulated by the parallelogram-linkage arrangement, which was constructed by the linkage piece 49 and the lever arm 59 (See FIG. 1). As this occurs the lever arm 60 and the linkage lever 69 swing downward, whereupon, the flap 4 closes. In the closed position, the flap 4 lies with its outside 28 against the sealing edge 27 and prevents a further inflow of fuel into the tank. The fuel then fills up the inlet pipe and brings the feed nozzle to a shutoff point. Thereby, in that the flap 4 is placed completely, including its pivoting axle, inside the valve body 1, no body penetrating openings are present, through which fuel can flow into the interior of the tank. In order that, even after the end of the tanking procedure, it is made possible that fuel can escape from the filling pipe, underside in the valve body, an escape opening 85 has been bored. The diameter of this boring is so designed, that the fuel flows out very slowly and therefore the sinking of the level of fuel in the filling pipe is scarcely noticeable.

To assure a tilt free operation of the pivot pins 33 of the flap 4 in the bearing seats 30, a bearing web 86 has been made in each, which is formed on the inside of the transverse wall 23 and runs at right angles to the respective housing web 32. The securement of the pivot pins 33 in the bearing seats 30 is carried out by two detent projections 87, which extend themselves from that end side proximal to the valve housing 1 of the inlet connection fixture 6 in the direction of the center axis 7 and which terminate shortly before the said bearing seats 30.

The above mentioned pivot pins, that is, pivot axles, and the bearing eyes which accommodate them, exhibit a relatively large amount of play, in order to make possible an easy movability of the combined parts. This easy movability, however, brings along with it, the fact that the float 3, can move itself in the direction of flow 93, especially upon impacts, such as the slamming of an auto door during the tanking procedure. This motion can be carried over into a upward float motion in accord with arrow 84. If this occurs, then the flap 4, would thereby move in the closure direction, that is, into the fuel feed flow. The fuel, which is then striking against the flap, would then close this flap 4 completely. This would have the result, that the feed nozzle outside would be shutoff, although the tank is not yet full. In order to prevent this, on the end of the float carrier 2 is placed a detent 88, on which the float 4, with its cross wall 76 strikes, in case of the said inadvertent sideways movement, i.e. as a result of the slamming of an auto door. The detent 88 is so positioned, that the inadvertent motion of the float 3 is stopped, before the flap 4 leaves the protective back cut area 89 of the flow diverter 83 and immerses itself in the flow of fuel. In the case of a normal float rise, on the other hand, the float rises without hindrance from the detent 88.

An unexpected closure movement of the float 3 can also be called up by an impulse from the kinetic energy of the flow of the fuel. If the upper wall 40 is made without an opening, then an impact of the fuel onto the underside of the float is inevitably certain. If, on the other hand, openings, somewhat like the opening 75, are available, then the possibility is present, that fuel flows through said opening into the float, and moves this again in the direction of arrow 84 (see FIG. 1) before the tank is filled. In the embodiment shown in FIG. 1 of a level limit valve, the opening 75, in this aspect, is scarcely a problem. Otherwise, this effect is more likely by a further opening 90, which is to be found at the free end of the wall 40. The linkage piece 49 and the lower area of the bearing clips 78 are pivotable into this opening, whereby the constructive height of the valve can be reduced. In order to hinder an inflow of fuel into this opening 90, in front of the opening 90, as seen in the direction of flow, an on the underside of the wall 40, is place a flow diverter 91.

What is claimed is:

1. A level limit valve for the fuel tank of a motor vehicle, the valve comprising:

a valve body which can be positioned inside the fuel tank on the end of a fuel filling pipe, the valve body having an inlet port connectable to the filling pipe and an outlet port into the interior of the fuel tank;

a float carrier attached to a downstream end of the valve body;

a flap disposed in the valve body which is pivotally secured between a closed position which tightly closes the outlet port and an opened position which opens the outlet port;

a lever rod connected to an outer side of the flap;

a float movably connected to the flap via the lever rod for pivotally moving the flap, the lever rod penetrating through the outlet port when the flap is in the opened position, a central axis of the valve body and a pivot axis of the flap extending in an essentially horizontal direction, the float being disposed on the top of the carrier and being pivotally mounted to the carrier via a linkage so as to be vertically movable, the float carrier defining a centrally located opening through which the lever rod extends;

wherein the valve body is essentially in the form of a tube section, whereby on the end surface facing fuel flow, a transverse wall is present, the wall containing the outlet port, on the inside of which a sealing edge is placed which peripherally encompasses the outlet port and coacts with the flap; and wherein two detent clips are located on an end of the inlet fitting extending in the direction of fuel flow, the inlet fitting being connected to the filling pipe and connected to the inlet port of the valve body, the detent clips protruding through the inlet port into the interior chamber of the valve and fixing the pivoting pins in the bearing seats.

2. A level limit valve as in claim 1, wherein an escape boring is defined through the valve body connecting an interior valve chamber with the interior space of the fuel tank.

3. A level limit valve as in claim 1, wherein the pivot axis of the flap is aligned with two pivot pins formed on the flap by cross pieces extending from the flap rim, whereby the pivot pins, pointing away from one another above the cross pieces in the pivot axis, engage in bearing seat on the inner side of the transverse wall.

4. A level limit valve as in claim 3, wherein the bearing seats are each made from a valve body web formed on the transverse wall inner side, the web extending into a space between the flap periphery and the pivot pin and being formed from the valve body wall.

5. A level limit valve as in claim 1, further including a flow diverter placed in the direction of flow before the flap to prevent a direct impact of the kinetic force of the flow on the flap when the flap is in its opened condition.

6. A level limit valve as in claim 5, wherein the flow diverter is disposed in the connection fitting.

7. A level limit valve as in claim 1, wherein the lever rod is pivotally mounted to the float carrier.

8. A level limit valve as in claim 7, wherein the float, when floated by fuel, is pivotally movable off the float carrier as constrained by the lever rod and linkage.

9. A level limit valve as in claim 8, wherein the lever rod and linkage are configured so as to provide a parallelogram linkage arrangement between the float carrier and the float.

10. A level limit valve for the fuel tank of a motor vehicle, the valve comprising:

a valve body which can be positioned inside the fuel tank on the end of a fuel filling pipe, the valve body having an inlet port connectable to the filling pipe and an outlet port into the interior of the fuel tank;

a float carrier attached to a downstream end of the valve body;

a flap disposed in the valve body which is pivotally secured between a closed position which tightly closes the outlet port and an opened position which opens the outlet port;

a lever rod connected to an outer side of the flap and pivotally mounted to the float carrier; and a float movably connected to the flap via the lever rod for pivotally moving the flap, the lever rod penetrating through the outlet port when the flap is in the opened position, a central axis of the valve body and a pivot axis of the flap extending in an essentially horizontal direction, the float being disposed on the top of the float carrier and being pivotally mounted to the float carrier via a linkage so as to be vertically movable, the float carrier defining a centrally located opening through which the lever rod extends, wherein the float, when floated by fuel, is pivotally movable off the float carrier as constrained by the lever rod and linkage, thereby moving the flap towards the closed position.

11. A level limit valve as in claim 10, wherein the lever rod and linkage are configured so as to provide a parallelogram linkage arrangement between the float carrier and the float.

12. A level limit valve as in claim 10, wherein an escape boring is defined through the valve body connecting an interior valve chamber with the interior space of the fuel tank.

13. A level limit valve as in with claim 10, wherein the valve body is essentially in the form of a tube section, whereby on the end surface facing fuel flow, a transverse wall is present, the wall containing the outlet port, on the inside of which a sealing edge is placed which peripherally encompasses the outlet port and coacts with the flap.

14. A level limit valve as in claim 13, wherein the pivot axis of the flap is aligned with two pivot pins formed on the flap by cross pieces extending from the flap rim, whereby the pivot pins, pointing away from one another above the cross pieces in the pivot axis, engage in bearing seat on the inner side of the transverse wall.

15. A level limit valve as in claim 14, wherein the bearing seats are each made from a valve body web formed on the transverse wall inner side, the web extending into a space between the flap periphery and the pivot pin and being formed from the valve body wall.

16. A level limit valve as in claim 10, further including a flow diverter placed in the direction of flow before the flap to prevent a direct impact of the kinetic force of the flow on the flap when the flap is in its opened condition.

17. A level limit valve as in claim 16, wherein the flow diverter is disposed in the connection fitting.

* * * * *

UNITED STATES PATENT AND TRADEMARK OFFICE
CERTIFICATE OF CORRECTION

PATENT NO. : 6,874,529 B2  
DATED : April 5, 2005  
INVENTOR(S) : Gebhardt et al.

Page 1 of 1

It is certified that error appears in the above-identified patent and that said Letters Patent is hereby corrected as shown below:

<u>Title page,</u>  
Item [56], References Cited, U.S. PATENT DOCUMENTS, add:
-- 4,986,320   01/1991   Kesterman, et al.  
   4,998,571   03/1991   Blue, et al.  
   5,398,735   03/1995   Lagache, Roland  
   5,485,866   01/1996   Bowen, James H.  
   5,564,465   10/1996   Pettesch, Martin C.  
   6,546,972   04/2003   Foltz, et al. --.

Signed and Sealed this

Twenty-fifth Day of April, 2006

JON W. DUDAS  
*Director of the United States Patent and Trademark Office*